United States Patent [19]

Brooks

[11] 4,202,256
[45] May 13, 1980

[54] POPCORN STIRRER

[76] Inventor: Robert S. H. Brooks, 4419 Fulton St., Sherman Oaks, Calif. 91403

[21] Appl. No.: 953,560

[22] Filed: Oct. 23, 1978

[51] Int. Cl.² .......................... B01F 7/16; A47J 36/06; A23L 1/18
[52] U.S. Cl. ...................................... 99/323.5; 99/348; 366/248; 366/343
[58] Field of Search ............... 99/348, 323.5; 366/242, 366/244, 245, 247, 248, 249, 251, 342, 343; 220/18; 215/100 R

[56] References Cited

U.S. PATENT DOCUMENTS

| | | | |
|---|---|---|---|
| 1,876,322 | 9/1932 | Rudolph | 220/18 R |
| 2,505,967 | 5/1950 | Humphrey | 366/248 |
| 2,778,613 | 1/1957 | Long | 366/248 |
| 3,027,036 | 3/1962 | Budreck | 215/100 R |
| 4,049,243 | 9/1977 | Kramer | 366/248 |

*Primary Examiner*—Robert W. Jenkins
*Attorney, Agent, or Firm*—Millard, Cox & Smith

[57] ABSTRACT

A stirring rod for use in a heating vessel which includes a contractable generally circular upper portion which is joined to a generally hooked shaped lower portion by a vertically extending rod section.

5 Claims, 5 Drawing Figures

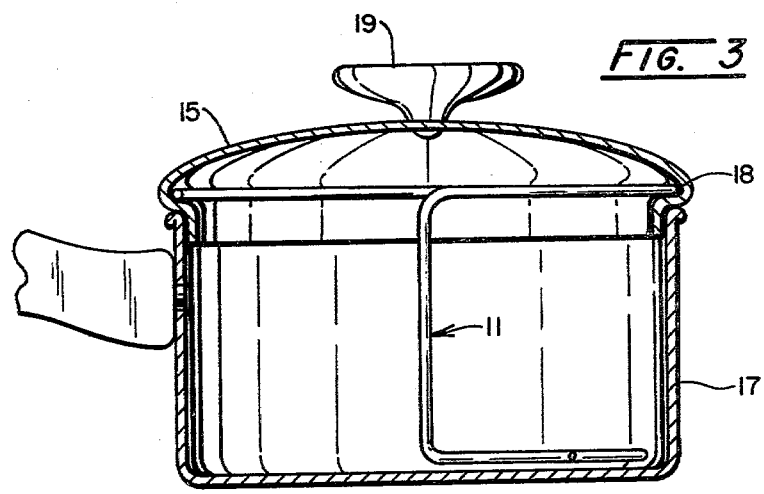
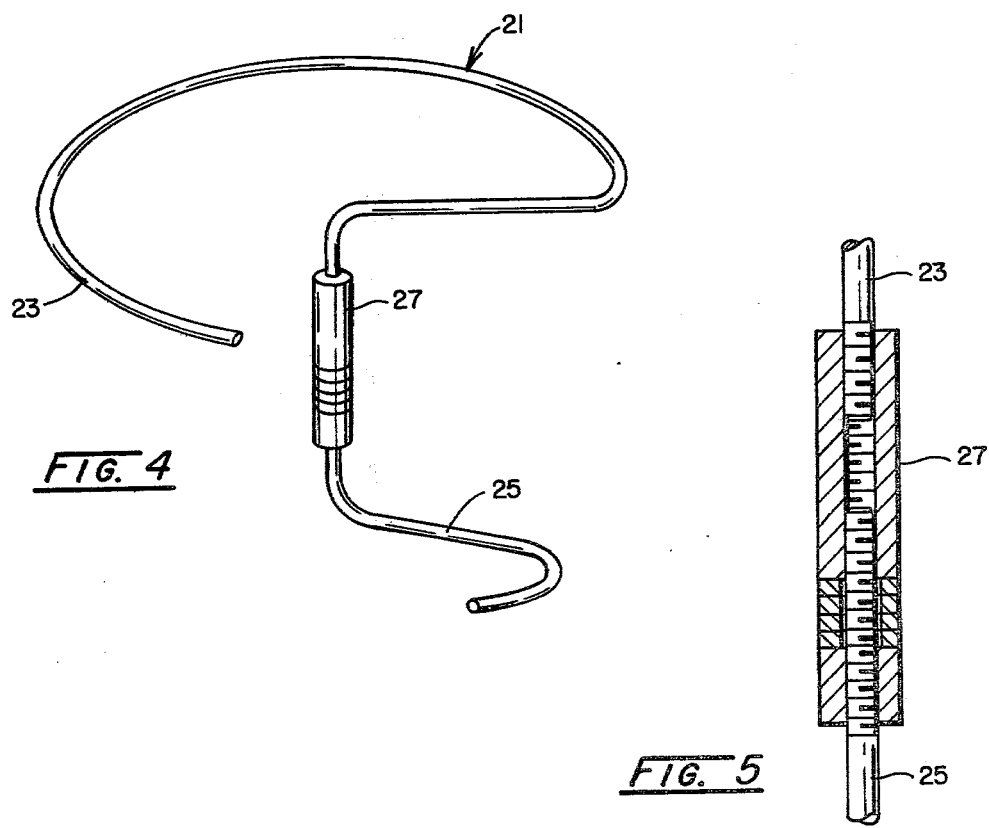

POPCORN STIRRER

BACKGROUND OF THE INVENTION

1. Field

The invention disclosed herein relates to stirrers for popcorn. In the heating of popcorn in order to expand the popcorn to make it more acceptable as an edible substance, it is very desirable that the popcorn be stirred during the heating process. Prior to this invention it has been usual to have a special cooking utensil for heating and expanding the popcorn. The invention disclosed herein saves the necessity of such a special utensil and enables the cook to convert any saucepan or similar utensil to a cooking utensil provided with an efficient stirrer for popcorn or any similar substance.

2. Prior Art

Many prior art patents have been issued relating to special utensil devices for the heating and expanding of popcorn in order to make it more tasty and edible and for the stirring of substances while they are being heated. Among those are the following which were found in a search of the prior art.

Hobbs U.S. Pat. No. 2,570,126, Oct. 2, 1951
Altemiller U.S. Pat. No. 2,654,823, Oct. 6, 1953
Sturrup U.S. Pat. No. 3,326,533, June 20, 1967
Johnson U.S. Pat. No. 3,415,497, Dec. 10, 1963
de Bruyne U.S. Pat. No. 3,913,895, Oct. 21, 1975
Grant British Pat. No. 122,093 Jan. 16, 1919

Of the above six patents the patent to Johnson relates to a combined blender and spatula and not to a popcorn stirrer. The Sturrup U.S. Pat. No. 3,326,533 relates to a nail polish stirrer and the Grant British Pat. No. 122,093 relates to an improvement in stirring and agitating devices for teapots, coffee pots, cocoa pots and the like. These patents relate to non-analagous art and it is believed that this application discloses an invention which is not obvious from the blender, the nail polish stirrer or the teapot, coffee pot, etc. Of the other three patents the one to de Bruyne, U.S. Pat. No. 3,913,895 relates to a stirrer for liquids in a sealable container. Hobbs U.S. Pat. No. 2,570,126 relates to a popcorn popping device and Altemiller also relates to a popcorn machine. Both of these last two patents are quite complicated and the stirrer extends through the container. The container is not usable for any purpose other than for the popping of popcorn. It is therefore believed that the invention disclosed herein should be considered patentable over the above references.

OBJECTS

It is an object of the invention to produce a device which can be secured within the lid of a pan and used to stir popcorn in the pan while it is being cooked but then may be removed from the cover of the pan and the pan used for other conventional purposes.

Further objects and features of the invention will be apparent from the following description and claims and the accompanying drawings.

SUMMARY OF THE INVENTION

This invention comprises a wire stirrer which can be inserted in the inside of a cover of a saucepan and is easily removable therefrom. When inserted, the contents in the saucepan (as for example, popcorn) can be stirred while it is being heated merely by turning the cover. This results in consequent improvement in the product and the improvement in the percentage or relative amount of the popcorn which is popped during the heating operation. Upon the removal of the stirrer the saucepan can be used for any other purpose desired.

BRIEF DESCRIPTION OF THE DRAWINGS

In the drawings:

FIG. 3 is a view in vertical section of a cooking vessel with a cover and with a stirrer such as is shown in FIG. 2 in place;

FIG. 4 is a view in perspective of a modified form of a stirrer rod also constructed according to my invention; and FIG. 5 is a view in vertical section showing the connection between the two parts of the rod of the embodiment of my invention shown in FIG. 4.

DETAILED DESCRIPTION OF PREFERRED EMBODIMENT OF THE INVENTION

Figure 1:
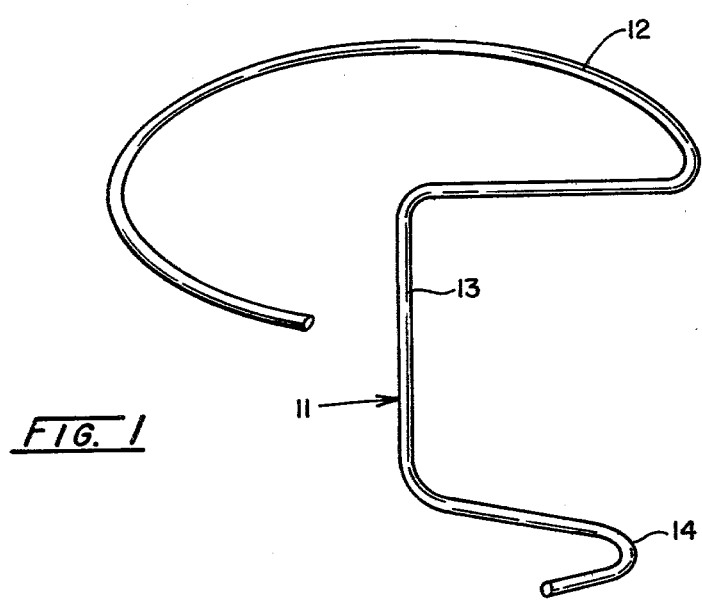
FIG. 1 is a view in perspective of a wire stirrer constructed in accordance with my invention.

Referring to the drawings for a more detailed description and referring first especially to FIG. 1 it can be seen that I have shown a stirring rod 11 shaped in accordance with my invention which is capable of performing the functions desired. The rod 11 is shaped so that it has a substantially circular or ring portion 12, a straight connecting portion 13 secured to the portion 12 and extending substantially parallel to the axis of the ring portion 12, and a hook portion 14 at the end of the connecting portion opposite to the ring portion 12. The hook portion 14 is bent at one end substantially about an axis parallel with the axis of the ring portion 12 and is in a plane parallel with the plane of the ring portion 12.

Figure 2:
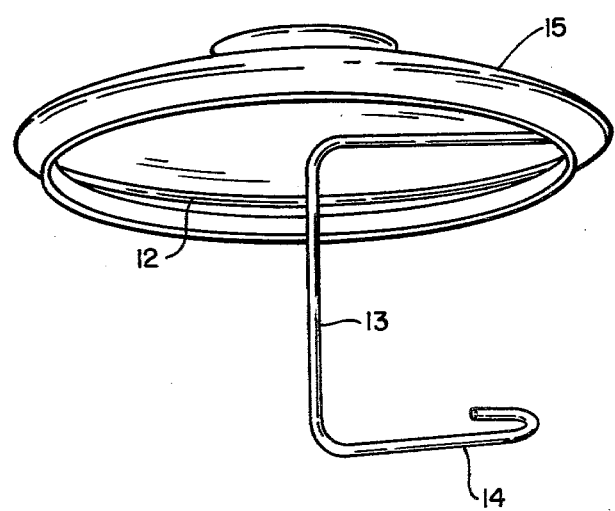
FIG. 2 is a perspective view of a cover for a saucepan with a stirrer similar to the wire stirrer of FIG. 1 inserted therein.

In FIG. 2 the ring portion 12 of the stirring rod 11 is shown inserted within the cover 15 for a saucepan and held removably within said cover.

In FIG. 3 I have shown a saucepan 17 having associated with it the cover 15 formed with a circular groove 18 and secured and held by the groove 18 of the cover 15 so that during operation, the stirring rod 11 may be rotated by rotating the cover without removing the cover. Thus the stirring rod 11 may stir the contents of the vessel 17 thus insuring more even and more thorough cooking of the material contained within the vessel 17. The cover 15 is provided with a knob 19. When desired the cover 15 may be removed together with the stirring rod 11 and the stirring rod 11 may be removed from the cover 15 for cleaning the cover 15 and the stirring rod 11 and for using the cooking vessel 17 and the cover 15 for any other purpose that may be desired.

DETAILED DESCRIPTION OF ALTERNATIVE EMBODIMENT

In FIG. 4 a different stirring rod 21 is shown having separate parts 23 and 25 which are connected by a connector 27.

In FIG. 5 the structure of the connector 27 together with portions of the rod 23 and 25 are shown.

OPERATION

The operation of the device is believed to be obvious from the description above. However it may be stated that when it is desired to cook material which must be stirred, the material is placed in a cooking vessel such as 17. Then the stirring rod 11, or the rod 21, is inserted in the groove 18 of the cover 15. Such circular grooves are normally formed around the circumference of such covers. The cover 15 and stirring rod 11 or 21 are then placed on and in the cooking vessel. During the cooking operation, the cook or other operator of the device turns the knob 19 of the cover 15. This turns the stirring rod 11 thus agitating the material which is being cooked within the vessel 17. In the case of heating popcorn, the stirring keeps the material moving and circulating so that the heat is not directed to any particular portion but to a whole mass that has been inserted in the vessel 17. After the cooking operation is over the cover 15 together with the stirring rod 11 may be removed for cleaning and the contents of the vessel 17 are put into another vessel. Then the vessel 17 is also cleaned. Thereafter, the vessel 17 and the cover 15 may be used for any other desired purpose.

In the embodiment shown in FIGS. 4 and 5 the two parts 23 and 25 may be separated from the connector 27 and all three parts cleaned more expeditiously than they would be if the stirrer were all in one piece.

It is to be understood that the above described embodiments of my invention are for the purpose of illustration only and various changes may be made therein without departing from the spirit and scope of the claims which follow.

I claim:

1. A stirring rod for use with a heating vessel having a cover incorporating a flange portion internestable and slidable within the upwardly disposed circular periphery of said vessel and extending outwardly therefrom about said periphery to define an annular groove of given radius internally disposed within said cover,
    said cover further including a handle fixed thereto at an outwardly disposed surface thereof,
    the rod comprising a resilient wire having a contractable substantially ring-shaped portion formed having a radius greater than said groove radius, the said ring portion being manually contractable for insertion and resilient retention within said groove,
    a substantially straight portion present as a shaft connected to one end of said ring portion by a radially inwardly projecting extension, and
    a hook-shaped portion connected to the opposite end of the straight portion so that rotation of said ring-shaped portion causes rotation of the hook portion to agitate material within the heating vessel to secure even heating of the material within the heating vessel.

2. The structure of claim 1 in which the ring-shaped portion is positioned in one plane and the hook-shaped portion is positioned substantially in a spaced plane which is substantially parallel to the plane of the ring-shaped portion.

3. The structure of claim 2 in which the substantially straight portion is substantially perpendicular to the two planes.

4. The structure of claim 1 in which the ring-shaped portion, the straight portion and the hook-shaped portion are integral.

5. The structure of claim 1 in which the stirring rod is formed of two pieces having a connector within said straight portion connectiong the two.

* * * * *